(12) United States Patent
Su

(10) Patent No.: US 6,234,065 B1
(45) Date of Patent: May 22, 2001

(54) STRUCTURE OF A BAKING OVEN

(76) Inventor: Yung-Sen Su, P.O. Box 82-144, Taipei (TW)

( * ) Notice: Subject to any disclaimer, the term of this patent is extended or adjusted under 35 U.S.C. 154(b) by 0 days.

(21) Appl. No.: 09/676,452

(22) Filed: Oct. 2, 2000

(51) Int. Cl.[7] ................................. A23L 1/00; A47J 27/00; A47J 37/00
(52) U.S. Cl. ................................. 99/341; 99/339; 99/355; 99/357; 99/348
(58) Field of Search .......................... 99/325–334, 339, 99/340, 341, 352–355, 357, 342, 348, 443 C, 443 R, 486; 426/231–233, 523; 219/400, 413, 490, 491, 494

(56) References Cited

U.S. PATENT DOCUMENTS

| | | | | |
|---|---|---|---|---|
| 3,827,345 | * | 8/1974 | Willson | 99/325 |
| 3,884,135 | * | 5/1975 | Lohr et al. | 99/348 |
| 3,945,309 | * | 3/1976 | Moran | 99/348 X |
| 3,986,443 | * | 10/1976 | Shimizu | 99/334 |
| 4,173,925 | * | 11/1979 | Leon | 99/348 |
| 4,195,558 | * | 4/1980 | Speakman | 99/325 |
| 4,289,064 | * | 9/1981 | Rosenblatt | 99/334 |
| 4,301,717 | * | 11/1981 | Knees | 99/348 |
| 4,304,177 | * | 12/1981 | Koether | 99/348 X |
| 4,331,068 | * | 5/1982 | Asami | 99/325 X |
| 4,437,159 | * | 3/1984 | Waugh | 99/327 X |
| 4,503,502 | * | 3/1985 | Chapin | 99/348 X |
| 4,700,617 | * | 10/1987 | Lee et al. | 99/327 |

* cited by examiner

Primary Examiner—Timothy F. Simone
(74) Attorney, Agent, or Firm—A & J

(57) ABSTRACT

A baking oven includes a housing having a baking chamber formed with a lateral opening, the housing having a top formed with a plurality of ventilation holes, a smoke filter mounted within the housing and located under the ventilation holes, a cover engaged with an end of the housing and provided with a transparent window, a tray inserted into the housing, a dropping mechanism mounted within the housing and provided with a baffle configured to close the opening of the baking chamber and a guiding plate forming a slope for transfer of baked foods, an electric fan mounted under the tray, a cooling tray mounted under the guiding plate of the dropping mechanism and located below the electric fan, the cooling tray being formed with a plurality of slots, an electric stirrer mounted in the cooling tray, and a bottom container arranged under the cooling tray.

4 Claims, 10 Drawing Sheets

STRUCTURE OF A BAKING OVEN

BACKGROUND OF THE INVENTION

1. Field of the Invention

This invention is related to an improvement in the structure of a baking oven which can facilitate the baking and cooling operation of food and the collection operation of the slag thereof.

2. Description of the Prior Art

The conventional baking oven for foods or beans generally includes a heater and a tray for transferring foods or beans into the heater. However, such a baking oven is fixed in structure and the foods or beans in baking cannot be turned over thereby making the foods or beans difficult to be baked evenly and therefore often making the foods or beans burnt. In addition, the tray must be manually removed from the baking oven thereby often causing burns to the operator. Furthermore, the slag of the foods or beans is difficult to collect, making the slag easily catch fire and produce thick smoke. Moreover, it is impossible to inspect whether the foods or beans are well done or not in baking so that it will be very difficult to control the quality of the foods or beans. Besides, the foods or beans cannot be cooled rapidly after baking.

Therefore, it is an object of the present invention to provide an improvement in the structure of a baking oven which can obviate and mitigate the above-mentioned drawbacks.

SUMMARY OF THE INVENTION

This invention is related to an improvement in the structure of a baking oven.

It is the primary object of the present invention to provide an improvement in the structure of a baking oven which can facilitate the baking and cooling operation of food and the collection operation of the slag thereof.

It is another object of the present invention to provide an improvement in the structure of a baking oven which enables an operator to get food sample in baking as required.

According to a preferred embodiment of the present invention, a baking oven includes a housing having a baking chamber formed with a lateral opening, the housing having a top formed with a plurality of ventilation holes, a smoke filter mounted within the housing and located under the ventilation holes, a cover engaged with an end of the housing and provided with a transparent window, a tray inserted into the housing, a dropping mechanism mounted within the housing and provided with a baffle configured to close the opening of the baking chamber and a guiding plate forming a slope for transfer of baked foods, an electric fan mounted under the tray, a cooling tray mounted under the guiding plate of the dropping mechanism and located below the electric fan, the cooling tray being formed with a plurality of slots, an electric stirrer mounted in the cooling tray, and a bottom container arranged under the cooling tray.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
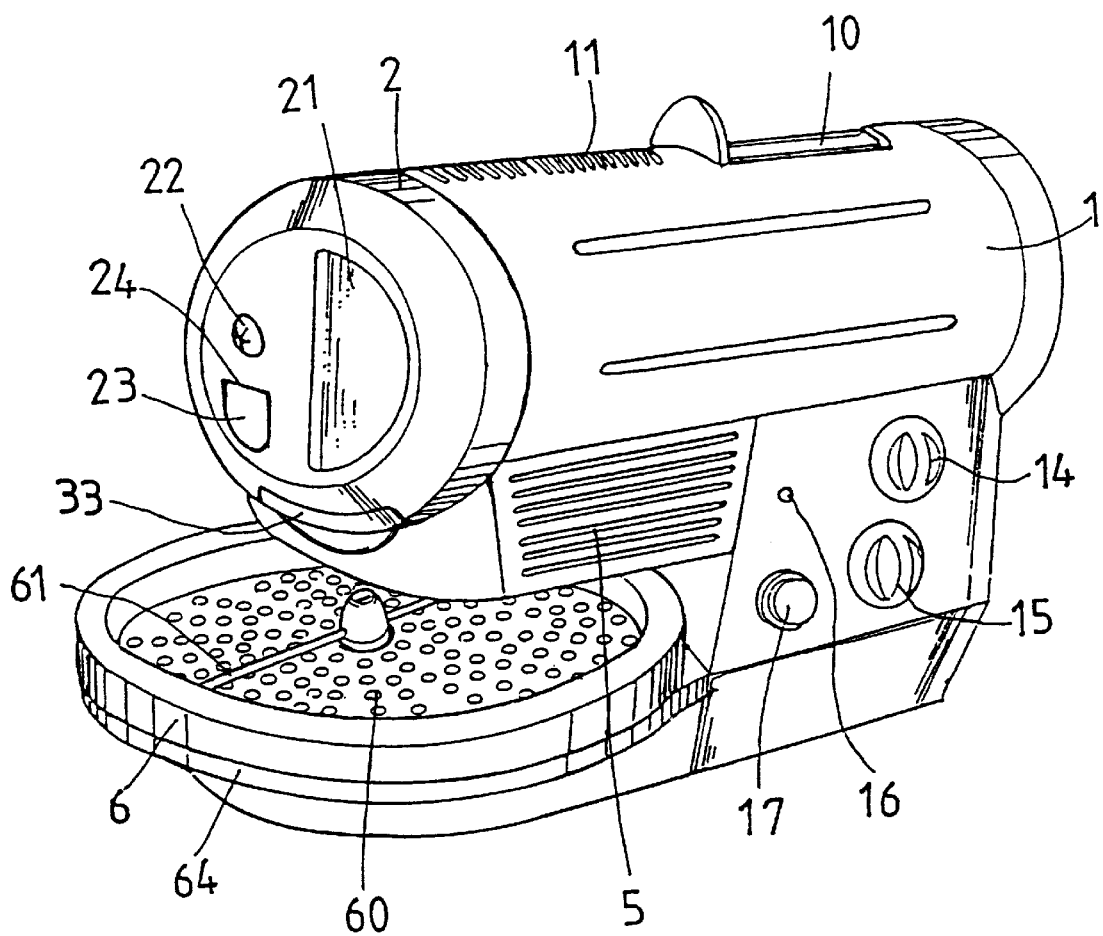
FIG. 1 is a perspective view of a baking oven according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
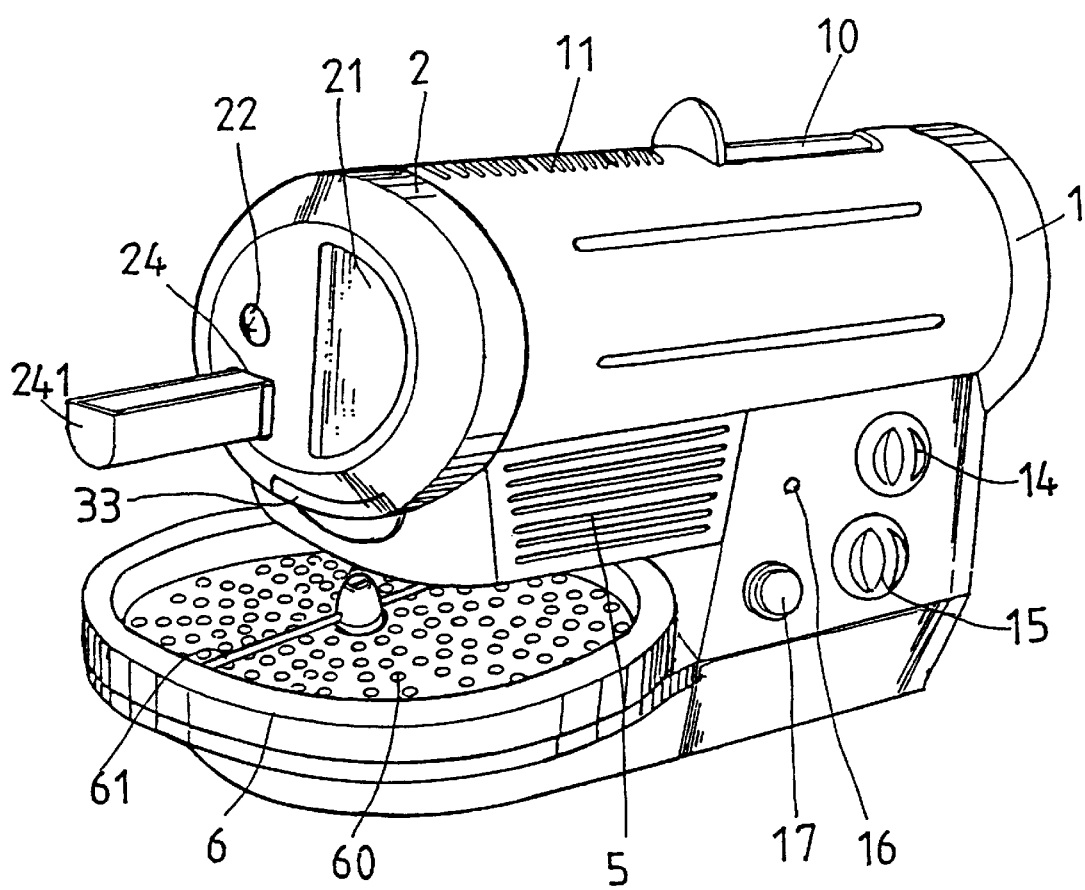
FIG. 2 is a perspective view of the baking oven, with the test drawer pulled out of the housing.
Figure 3:
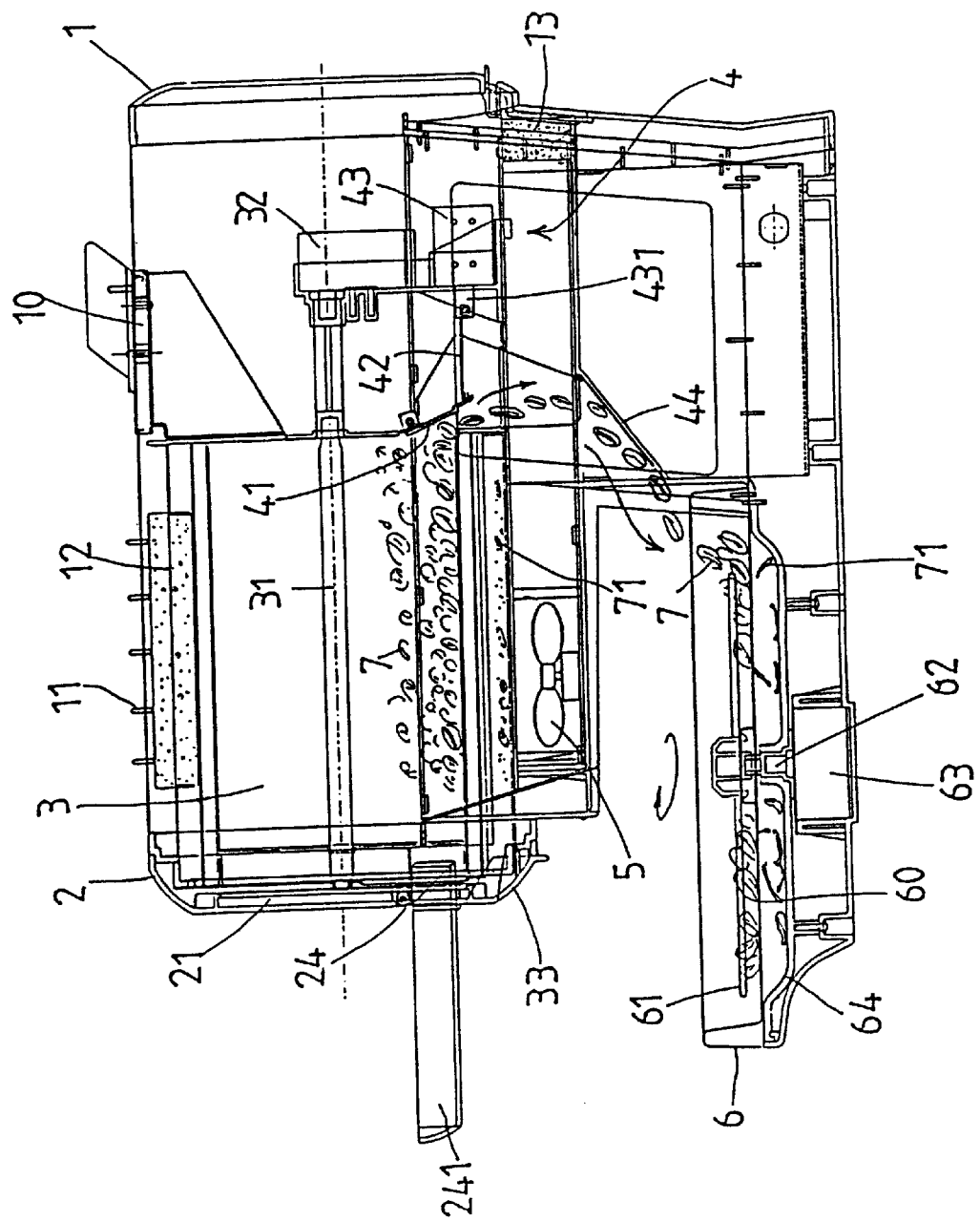
FIG. 3 is a sectional view of the baking oven.
Figure 4:
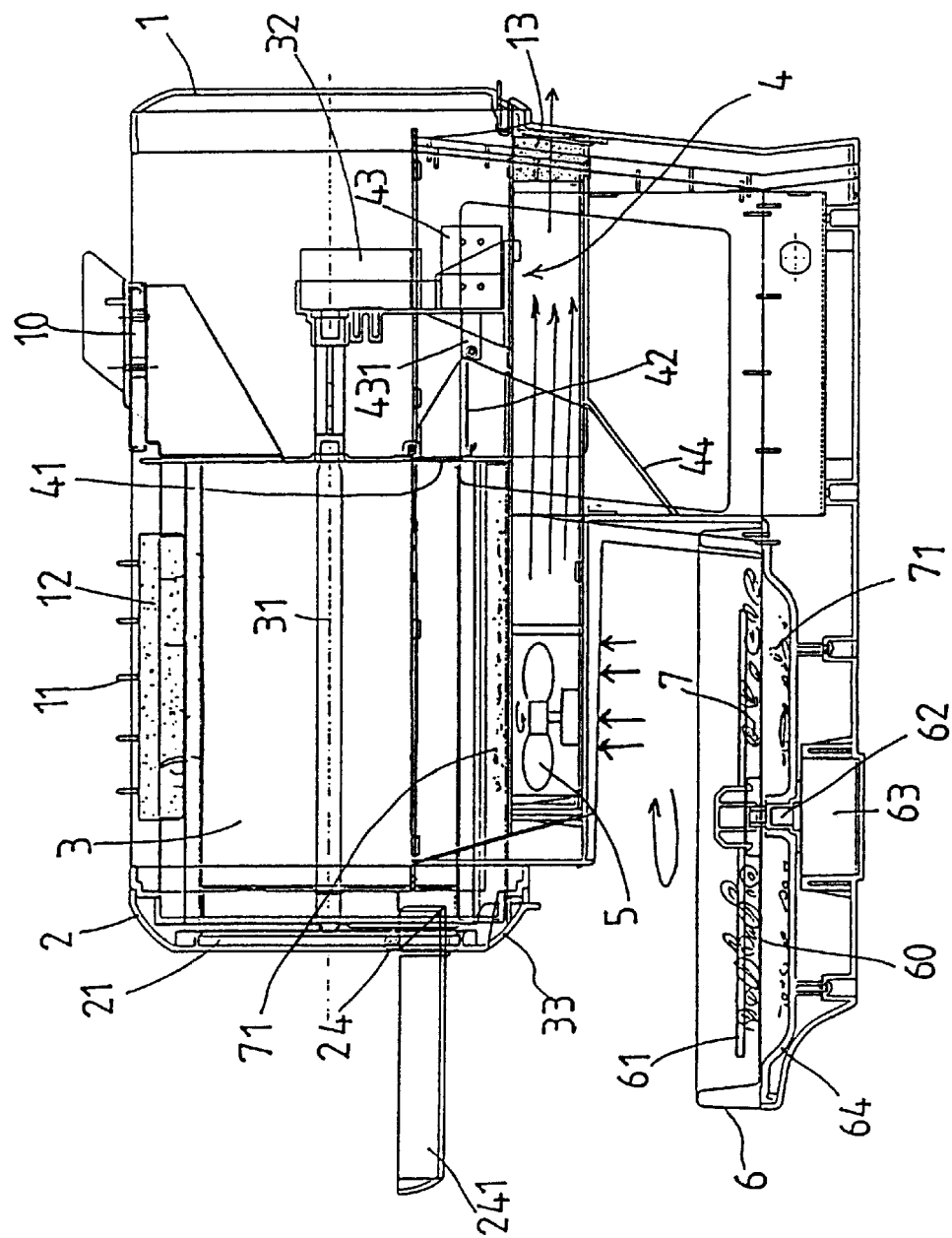
FIG. 4 is a sectional view of the baking oven, with the cooling fan turned on to cool the food.
Figure 5:
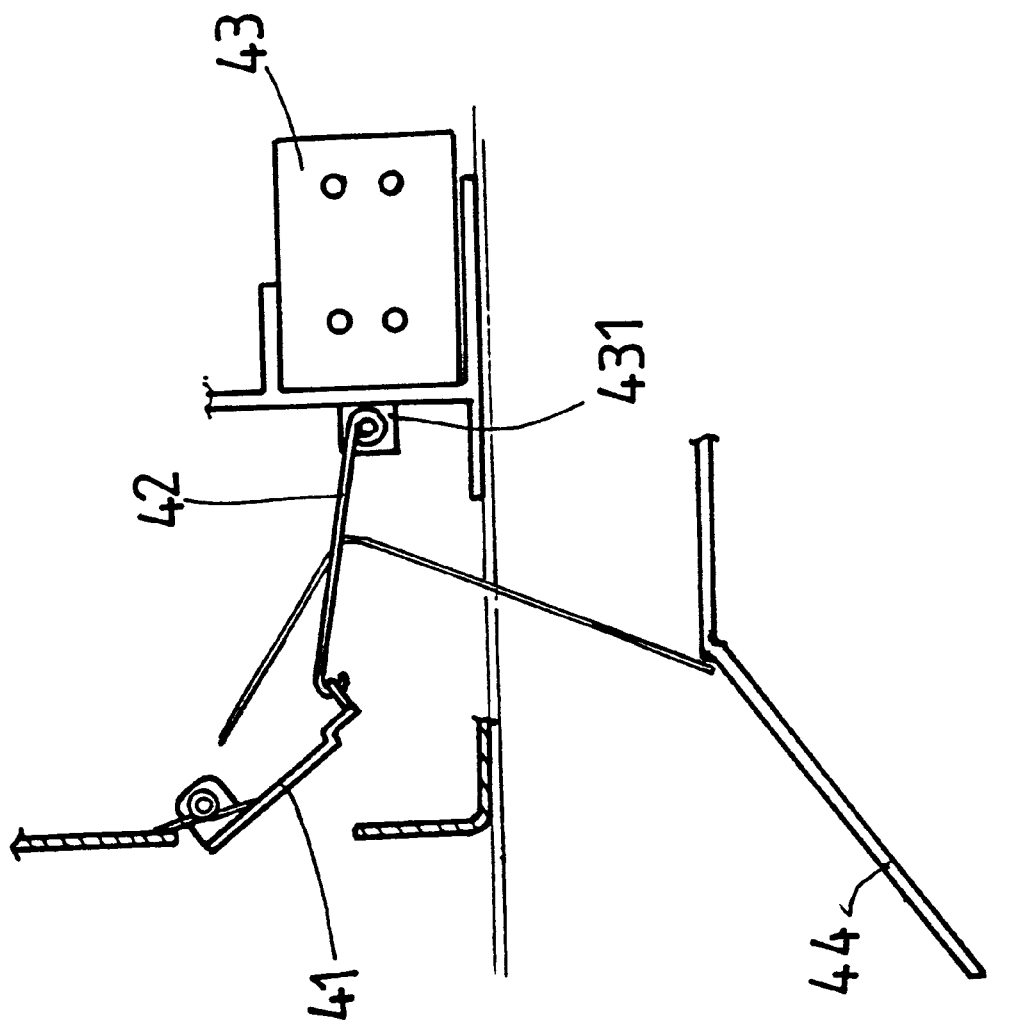
FIG. 5 is a sectional view of the dropping mechanism, with the baffle closed.
Figure 6:
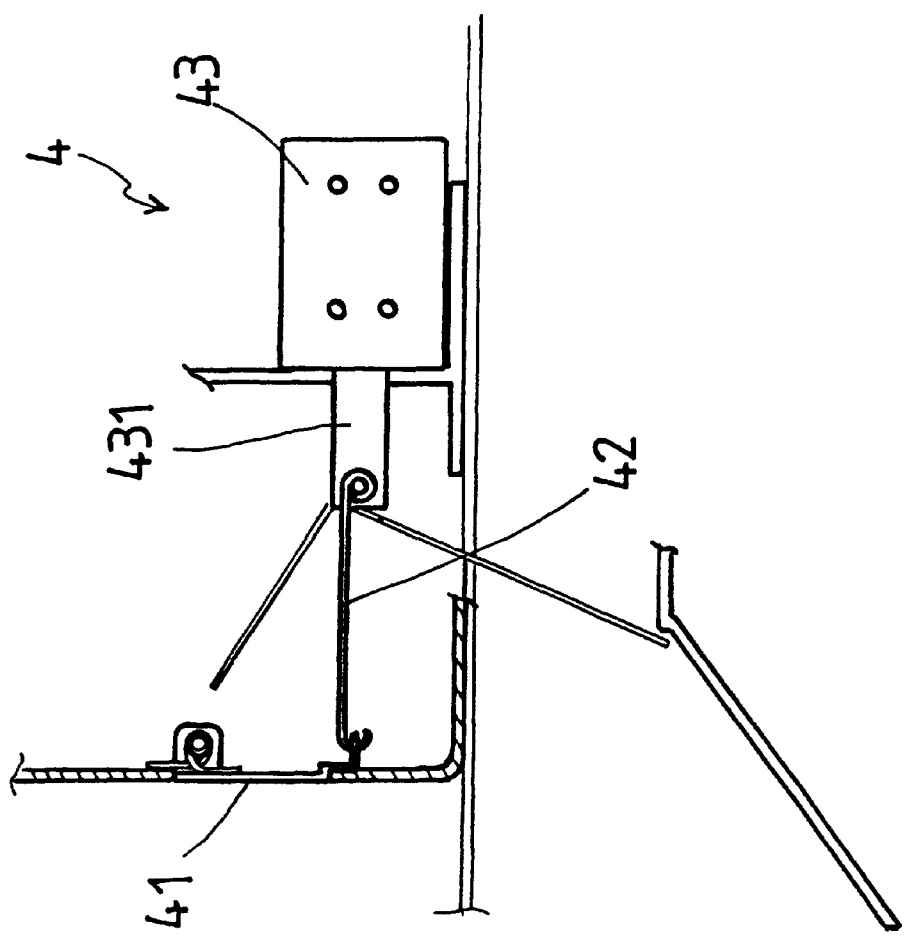
FIG. 6 is a sectional view of the dropping mechanism, with the baffle opened.

With reference to the drawings and in particular to FIGS. 1, 2 and 3 thereof, the baking oven according to the present invention generally comprises a housing 1, a cover 2 engaged with an end of the housing 1 and provided with a transparent window 21, a baking chamber 3 formed inside the housing 1 and provided with an axle 31, a tray 33 inserted into the housing 1, a dropping mechanism 4, an electric fan 5, and a cooling tray 6. The top of the housing 1 is formed with a plurality of ventilation holes 11, a smoke filter 12 mounted under the ventilation holes 11, and an inlet 10 for the passage of food or bean 7 into the baking chamber 30. Within the baking chamber 30 are mounted heating elements (not shown). An electric motor 32 is arranged within housing 1 and drivingly connected with an axle 31. The tray 33 is mounted below the baking chamber 3 for receiving the foods, beans, or the like to be baked. The cover 2 is fixedly mounted on one end of the housing 1 by a screw 22 and has a transparent window 21 for inspecting the baking chamber 30 from outside. The cover 2 is further formed with an opening 24 which is normally closed with a lid 23. A test drawer 241 is inserted into the baking chamber 30 through the opening 24 as required so as to get samples of the foods, beans, coffee beans, . . . etc. The fan 5 is mounted under the tray 33. The dropping mechanism 4 is arranged below the electric motor 32. Referring to FIGS. 2, 3, 4, 5 and 6, the dropping mechanism 4 includes a baffle 41 engaged with an opening at the rear side of the baking chamber 3, a pull rod 42 having an end engaged with the baffle 41 and another end engaged with an axle 431 of a solenoid valve 43. When the solenoid valve 43 is actuated to retract the axle 431, the pull rod 42 will be drawn to pull back the baffle 41 to open the opening thereby allowing the food and bean 7 which have been baked to fall down along a guide plate 44 into the cooling tray 6 (see FIG. 5). After that, the solenoid valve 43 will be actuated to push the baffle 41 against the opening at the rear side of the baking chamber 3 (see FIG. 6). The baffle 41 is provided with a spring (shown but not numbered) which tends to urge the baffle 41 to close the opening at the rear side of the baking chamber 3.

Figure 7:
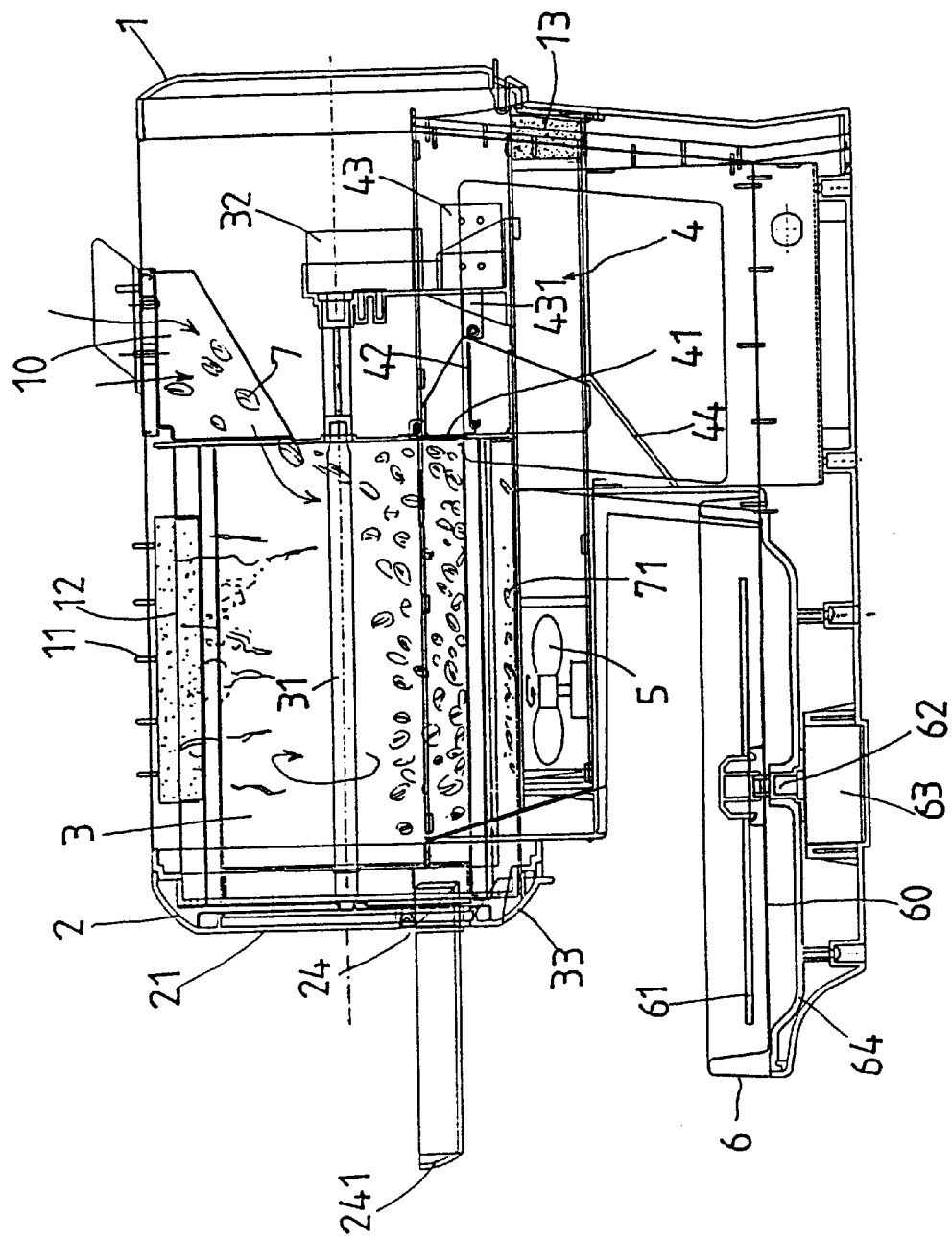
FIG. 7 is a sectional view of the present invention, with the food feeding into the baking oven.
Figure 8:
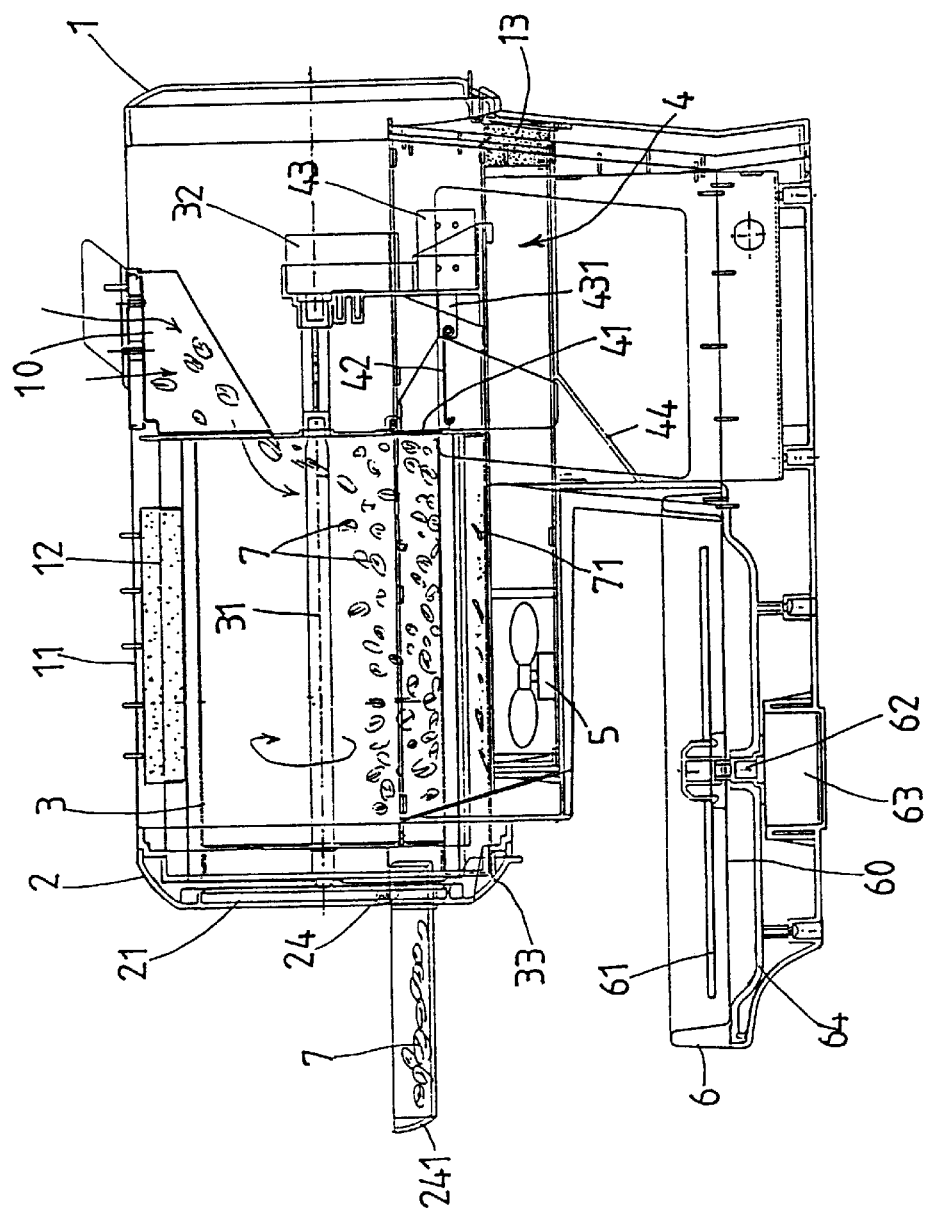
FIGS. 8 and 9 illustrate how to get some sample food from the baking oven with the test drawer.
Figure 9:
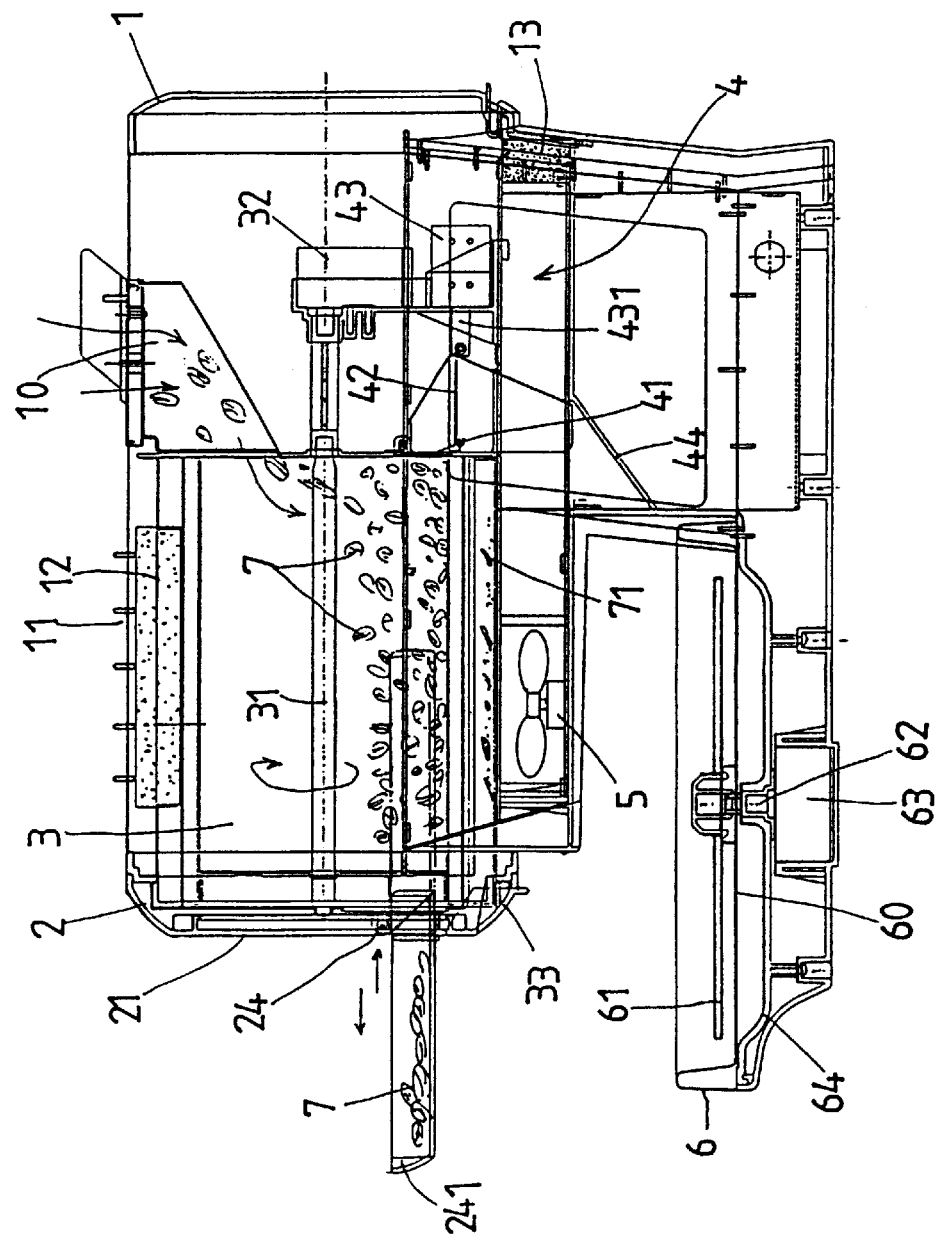
Figure 10:
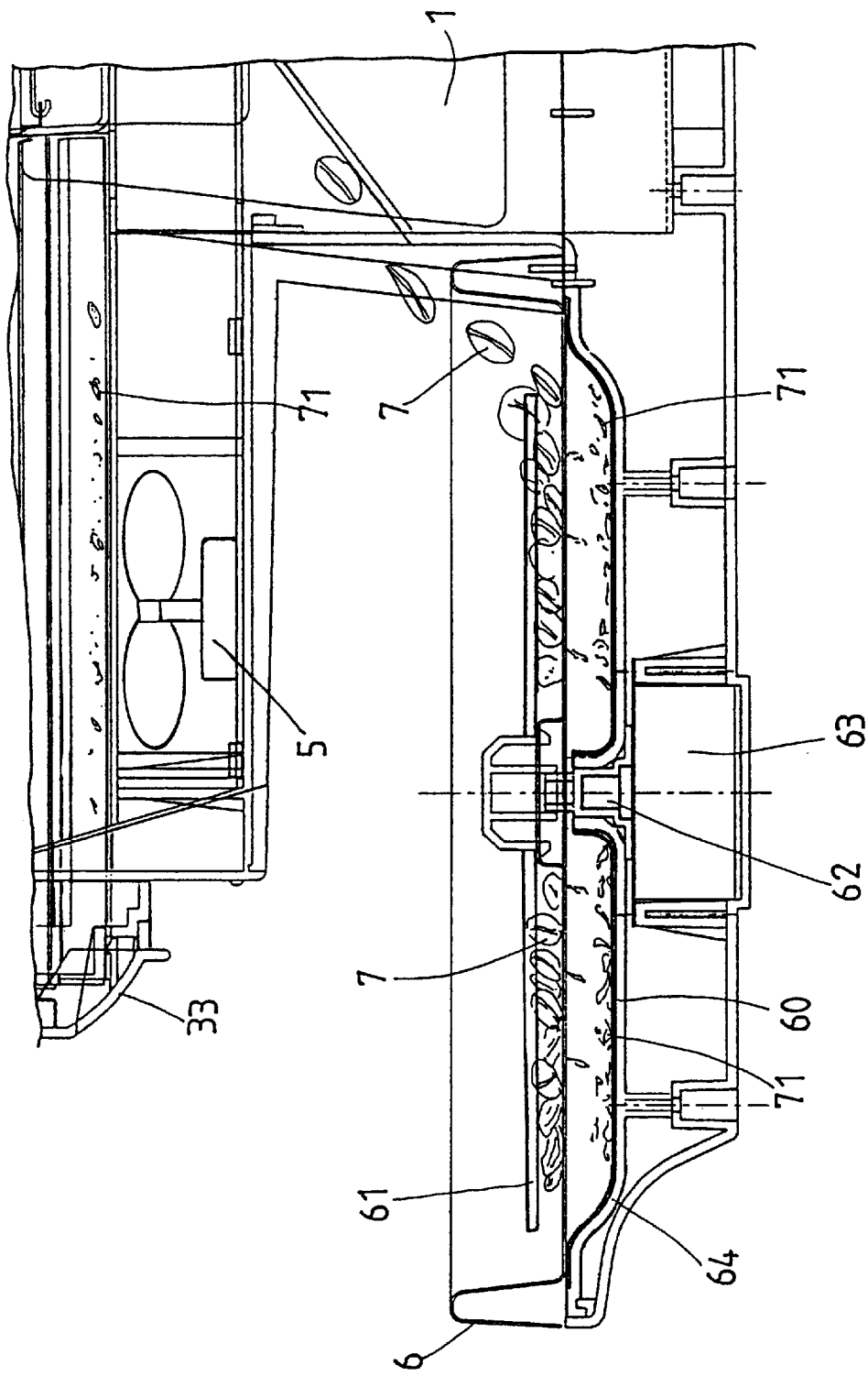
FIG. 10 is an enlarged view of the cooling tray.

When the food or bean 7 falls into the cooling tray 6 through the guiding plate 44, the stirrer 61 mounted on an output axle 62 of an electric motor 63 will rapidly rotated to stir the food or bean 7. The cooling tray 6 is formed with a plurality of slots 60 so that the slag 71 will drop down into a container 64 (see FIG. 3). As the food or bean 7 is still hot, the fan 5 is turned on to cool down the food or bean 7. Thereafter, the heated air is exhausted out of the housing 1 through the smoke filter 13. Referring to FIG. 7, the thick fume produced in baking will be exhausted out of the ventilation holes 11 through the smoke filter 12 by the fan 5. FIG. 8 illustrates that the testing drawer 241 has not yet been inserted into the housing. FIG. 9 illustrates how to use the testing drawer 241 to get sample of the food or bean 7 from the baking chamber 3. FIG. 10 is an enlarged view of the cooling tray on which is arranged the stirrer 61 for separating the slag 71 from the food or bean 7 thereby causing the slag 71 to drop down into the bottom container 64 through the slots 60 of the cooling tray 6. Furthermore, the housing 1 is provided with a timer 14, a temperature control button 15, an indicating light 16 and a switch 17.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A baking oven comprising:

a housing having a baking chamber formed with a lateral opening, said housing having a top formed with a plurality of ventilation holes;

a smoke filter mounted within said housing and located under said ventilation holes;

a cover engaged with an end of said housing and provided with a transparent window;

a tray inserted into said housing;

a dropping mechanism mounted within said housing and provided with a baffle configured to close said opening of said baking chamber and a guiding plate forming a slope for transfer of baked foods;

an electric fan mounted under said tray;

a cooling tray mounted under said guiding plate of said dropping mechanism and located below said electric fan, said cooling tray being formed with a plurality of slots;

an electric stirrer mounted in said cooling tray; and a bottom container arranged under said cooling tray.

2. The baking oven as claimed in claim 1, wherein said cover is provided with a transparent window.

3. The baking oven as claimed in claim 1, wherein said housing has an end formed with an opening in which is fitted a test drawer.

4. The baking oven as claimed in claim 3, wherein said opening is provided with a lid.

\* \* \* \* \*